US006757773B1

(12) United States Patent
Brelin

(10) Patent No.: US 6,757,773 B1
(45) Date of Patent: Jun. 29, 2004

(54) SYSTEM AND METHOD FOR DETERMINING SUPPORT CAPABILITY OF A DEVICE COUPLED TO A BUS SYSTEM

(75) Inventor: Jon Ebbe Brelin, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 489 days.

(21) Appl. No.: 09/608,121

(22) Filed: Jun. 30, 2000

(51) Int. Cl.[7] .............................................. G06F 13/14
(52) U.S. Cl. ........................................ 710/305; 710/5
(58) Field of Search ................................ 710/305, 105, 710/100, 5, 52; 707/3, 100

(56) References Cited

U.S. PATENT DOCUMENTS

| | | | |
|---|---|---|---|
| 4,538,259 A | 8/1985 | Moore | 370/60 |
| 4,935,894 A | 6/1990 | Ternes et al. | 710/128 |
| 5,381,138 A | 1/1995 | Stair et al. | 340/825.44 |
| 5,394,556 A | 2/1995 | Oprescu | |
| 5,402,416 A | 3/1995 | Cieslak et al. | 370/60 |
| 5,414,839 A | 5/1995 | Joshi | |
| 5,485,505 A | 1/1996 | Norman et al. | 379/58 |
| 5,511,165 A | 4/1996 | Brady et al. | 709/216 |
| 5,579,486 A | 11/1996 | Oprescu et al. | |
| 5,603,084 A | 2/1997 | Henry, Jr. et al. | 455/33.1 |
| 5,623,483 A | 4/1997 | Agrawal et al. | 370/253 |
| 5,630,173 A | 5/1997 | Oprescu | |
| 5,669,002 A | 9/1997 | Buch | |
| 5,684,796 A | 11/1997 | Abidi et al. | 370/389 |
| 5,684,959 A | 11/1997 | Bhat et al. | |
| 5,689,499 A | 11/1997 | Hullett et al. | 370/235 |
| 5,717,853 A | 2/1998 | Deshpande et al. | |
| 5,724,517 A | 3/1998 | Cook et al. | 395/200.57 |
| 5,734,824 A | 3/1998 | Choi | 395/200.11 |
| 5,751,967 A | 5/1998 | Raab et al. | 395/200.58 |
| 5,757,772 A | 5/1998 | Thornberg et al. | 370/236 |
| 5,764,930 A | 6/1998 | Staats | 710/107 |
| 5,774,683 A | 6/1998 | Gulick | 710/129 |
| 5,790,530 A | 8/1998 | Moh et al. | 370/363 |
| 5,790,815 A | 8/1998 | Swanstrom et al. | 395/309 |
| 5,812,774 A | 9/1998 | Kempf et al. | 395/200.42 |
| 5,825,752 A | 10/1998 | Fujimori et al. | 370/260 |
| 5,832,245 A | 11/1998 | Gulick | 710/129 |
| 5,842,124 A | 11/1998 | Kenagy et al. | 455/418 |
| 5,848,266 A | 12/1998 | Scheurich | 395/558 |
| 5,854,910 A | 12/1998 | Gulick | 710/129 |
| 5,870,387 A | 2/1999 | Mulla | 370/258 |
| 5,872,524 A | 2/1999 | Iida | 340/825.52 |
| 5,872,944 A | 2/1999 | Goldrian et al. | 395/306 |
| 5,875,301 A | 2/1999 | Duckwall et al. | 395/200.51 |
| 5,883,621 A | 3/1999 | Iwamura | 345/327 |
| 5,892,929 A | 4/1999 | Welker | 710/107 |
| 5,901,332 A | 5/1999 | Gephardt et al. | 395/861 |
| 5,905,732 A | 5/1999 | Fimoff et al. | 370/516 |
| 5,910,178 A | 6/1999 | Moh et al. | 709/232 |

(List continued on next page.)

OTHER PUBLICATIONS

1394 Trade Association, The Multimedia Connection, TA Document 12999026, A V/C General Command and Response Model 4.1, Draft 0.1:35, May 22, 1999, pp. 1–46.

1394 Trade Association, The Multimedia Connection, TA Document 1999025, A V/C Descriptor and Info Block mechanism, Draft 0.:212, Dec. 17, 1999, pp. 1–143.

(List continued on next page.)

*Primary Examiner*—Glenn A. Auve
*Assistant Examiner*—X. Chung-Trans
(74) *Attorney, Agent, or Firm*—Blakely, Sokoloff, Taylor & Zafman LLP

(57) ABSTRACT

A system and method for determining support capability of a device coupled to a bus system are described. A command is received from a device, the command requesting support capability information. The command is parsed to extract a plurality of command fields. A response is then transmitted based on the plurality of command fields extracted.

58 Claims, 8 Drawing Sheets

U.S. PATENT DOCUMENTS

| | | | | |
|---|---|---|---|---|
| 5,920,267 | A | 7/1999 | Tattersall et al. | 340/825.05 |
| 5,923,673 | A | 7/1999 | Henrikson | 714/712 |
| 5,930,703 | A | 7/1999 | Cairns | 455/418 |
| 5,935,208 | A | 8/1999 | Duckwall et al. | 709/221 |
| 5,941,964 | A | 8/1999 | Young et al. | 710/100 |
| 5,961,623 | A | 10/1999 | James et al. | 710/113 |
| 5,970,234 | A | 10/1999 | Jin | 710/111 |
| 5,974,036 | A | 10/1999 | Acharya et al. | 370/331 |
| 5,978,854 | A | 11/1999 | Fujimori et al. | 709/245 |
| 5,991,520 | A | 11/1999 | Smyers et al. | 395/280 |
| 6,005,852 | A | 12/1999 | Kokko et al. | 370/329 |
| 6,023,732 | A | 2/2000 | Moh et al. | 709/232 |
| 6,032,202 | A | 2/2000 | Lea et al. | |
| 6,032,211 | A | 2/2000 | Hewitt | 710/107 |
| 6,038,625 | A | 3/2000 | Ogino et al. | 710/104 |
| 6,055,561 | A | 4/2000 | Feldman et al. | 709/200 |
| 6,055,589 | A * | 4/2000 | Kawamura et al. | 710/52 |
| 6,072,772 | A | 6/2000 | Charny et al. | 370/229 |
| 6,085,270 | A | 7/2000 | Gulick | 710/100 |
| 6,104,706 | A | 8/2000 | Richter et al. | 370/263 |
| 6,108,718 | A | 8/2000 | Fujimori et al. | 710/9 |
| 6,119,243 | A | 9/2000 | Garney et al. | 713/600 |
| 6,131,119 | A | 10/2000 | Fukui | 709/224 |
| 6,137,777 | A | 10/2000 | Vaid et al. | 370/230 |
| 6,138,178 | A | 10/2000 | Watanabe | 710/8 |
| 6,138,196 | A | 10/2000 | Takayama et al. | 710/105 |
| 6,141,767 | A | 10/2000 | Hu et al. | 714/1 |
| 6,148,241 | A | 11/2000 | Ludtke et al. | |
| 6,151,651 | A | 11/2000 | Hewitt et al. | 710/129 |
| 6,157,972 | A | 12/2000 | Newman et al. | |
| 6,160,796 | A | 12/2000 | Zou | |
| 6,185,632 | B1 | 2/2001 | Berkema | 710/20 |
| 6,192,428 | B1 | 2/2001 | Abramson et al. | 710/52 |
| 6,219,697 | B1 | 4/2001 | Lawande et al. | |
| 6,359,901 | B1 | 3/2002 | Todd et al. | |
| 6,360,287 | B1 * | 3/2002 | Kawamura | 710/61 |
| 6,378,000 | B1 | 4/2002 | Akatsu et al. | |
| 6,381,655 | B1 * | 4/2002 | Kawamura et al. | 710/5 |
| 6,389,496 | B1 | 5/2002 | Matsuda | |
| 6,394,905 | B1 | 5/2002 | Takeda et al. | |
| 6,434,117 | B1 | 8/2002 | Momona | |
| 6,442,621 | B1 * | 8/2002 | Kondo et al. | 710/5 |
| 6,460,030 | B1 * | 10/2002 | Ludtke | 707/3 |
| 6,463,550 | B1 | 10/2002 | Cepulis et al. | |
| 6,496,945 | B2 | 12/2002 | Cepulis et al. | |
| 6,513,064 | B1 * | 1/2003 | Horiguchi et al. | 709/223 |
| 6,519,656 | B2 * | 2/2003 | Kondo et al. | 710/6 |
| 6,522,654 | B1 | 2/2003 | Small | |
| 6,571,139 | B1 * | 5/2003 | Kawamura et al. | 700/83 |

OTHER PUBLICATIONS

"IEEE 1394: A Ubiquitous Bus", Gary Hoffman and Daniel Moore, Compcon '95 in San Francisco, CA 3/5–3/9/95. http://www.skiptone.com/compcon.html (9 pgs).

"Fire on the Wire: The IEEE 1934 High Performance Serial Bus", The IEEE Microcomputer Standards Committee, 1986. http://www.chumpchange.com/parkplace/video/dvpapers/firewire.html (4 pgs.).

* cited by examiner

| | msb | | | | | | lsb |
|---|---|---|---|---|---|---|---|
| opcode | WRITE DESCRIPTOR (0A₁₆) | | | | | | |
| operand[0] | descriptor_specifier_response_length | | | | | | |
| operand[1] | supported_specifier_type[0] | | | | | | |
| : | supported_specifier_type[1] | | | | | | |
| : | : | | | | | | |
| : | supported_specifier_type[n] | | | | | | |
| : | subfunction_reponse_length | | | | | | |
| : | supported_subfunction_value[0] | | | | | | |
| : | supported_subfunction_value[1] | | | | | | |
| : | : | | | | | | |
| : | supported_subfunction_value[n] | | | | | | |
| : | group_tag_supported = 0 or 1 | | | | | | |
| : | data_length_response_length = 0 | | | | | | |
| : | data_response_length = 0 | | | | | | |
| : | address_response_length = 0 | | | | | | |
| : | data_response_length = 0 | | | | | | |

Figure 7

SYSTEM AND METHOD FOR DETERMINING SUPPORT CAPABILITY OF A DEVICE COUPLED TO A BUS SYSTEM

FIELD OF THE INVENTION

The present invention relates generally to data retrieval and, more particularly, to a system and method for determining support capability of a device coupled to a bus system.

BACKGROUND OF THE INVENTION

With the development of consumer electronic audio/video (A/V) equipment, and the advance of digital A/V applications, such as consumer A/V device control and signal routing for applications such as home networking, various types of data in various formats can now be transferred among several audio/video control (AV/C) devices via one digital bus system. One example of such a bus system, configured as a digital interface used to transport commands and data among interconnecting devices, such as AV/C devices, is the IEEE 1394 standard serial bus implemented by IEEE Std 1394-1995, *Standard For A High Performance Serial Bus*, Aug. 30, 1996 (hereinafter "IEEE 1394 standard").

The IEEE 1394 standard is an international standard for implementing a high-speed serial bus architecture, which supports both asynchronous and isochronous format data transfers. The IEEE 1394 standard defines a bus as a non-cyclic interconnect, consisting of bus bridges and nodes. Within a non-cyclic interconnect, devices may not be connected together so as to create loops. Within the non-cyclic interconnect, each node contains an AV/C device, and bus bridges serve to connect buses of similar or different types.

SUMMARY OF THE INVENTION

A system and method for determining support capability of a device coupled to a bus system are described. A command is received from a device, the command requesting support capability information. The command is parsed to extract a plurality of command fields. A response is then transmitted based on the plurality of command fields extracted.

BRIEF DESCRIPTION OF THE DRAWINGS

The present invention is illustrated by way of example and not limitation in the figures of the accompanying drawings, in which like references indicate similar elements and in which:

FIG. 7 is a table illustrating the format and content of a SPECIFIC INQUIRY response frame sent in response to the WRITE DESCRIPTOR—CONTROL command frame;

DETAILED DESCRIPTION

Figure 1:
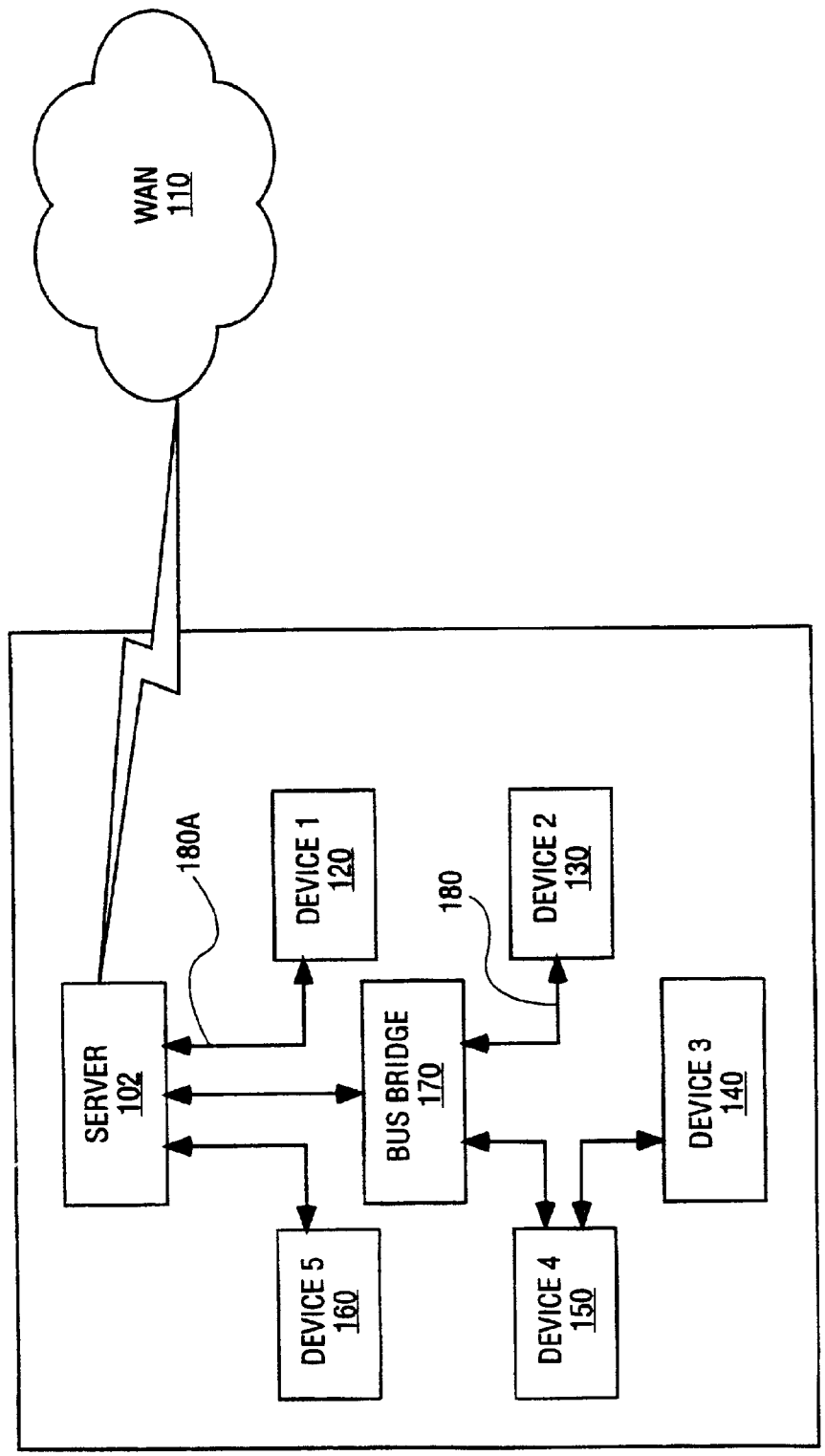
FIG. 1 is a block diagram of one embodiment for an interconnect topology.

A system and method for determining support capability of a device coupled to a bus system are described. In the following detailed description of embodiments of the invention, reference is made to the accompanying drawings in which like references indicate similar elements, and in which are shown by way of illustration specific embodiments in which the invention may be practiced.

Numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention are described in terms of computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

FIG. 1 is a block diagram of one embodiment for an interconnect topology. Referring to FIG. 1, server 102 is connected to a wide area network (WAN) 110 and to a bus bridge 170. Bus bridge 170 is interconnected to a number of audio, video, and/or audio/video devices, 120, 130, 140, 150, and 160. In one embodiment, the devices (120–160) are connected to bus bridge 170 via the IEEE 1394 standard serial bus. Server 102 may be any device that is capable of connection to both bus bridge 170 and wide area network 110, such as, for example, a personal computer or a set-top box. In one embodiment, network 110 may be a wide area network, such as, for example, the Internet, or a propriety network such as America Online®, Compuserve®, Microsoft Network®, or Prodigy®. In addition, WAN 110 may be a television communications network. Server 102 includes a network interface which communicates with WAN 110.

Topology 100 includes high speed serial bus 180A and 180. In one embodiment, serial bus 180 is the IEEE 1394 standard serial bus. Topology 100 includes various consumer electronic devices 120–160 connected via the high speed serial bus 180 to bus bridge 170. The consumer electronic devices 120–160 may include, for example, a printer, additional monitor, a video camcorder, an electronic still camera, a video cassette recorder, digital speakers, a personal computer, an audio actuator, a video actuator, or any other consumer electronic device that includes a serial interface which complies with a serial interface standard for networking consumer electronic devices—for example, the IEEE 1394 standard. Topology 100 may be contained within a home or office. Bus bridge 170 is used to connect devices 120–160 in which devices 120–160 may be physically located within different rooms of the home or office. Although the original IEEE 1394 bus standard is designed for use with a cable interconnect, any communication media may be used such as radio frequency (RF) communication or the like.

Figure 2:
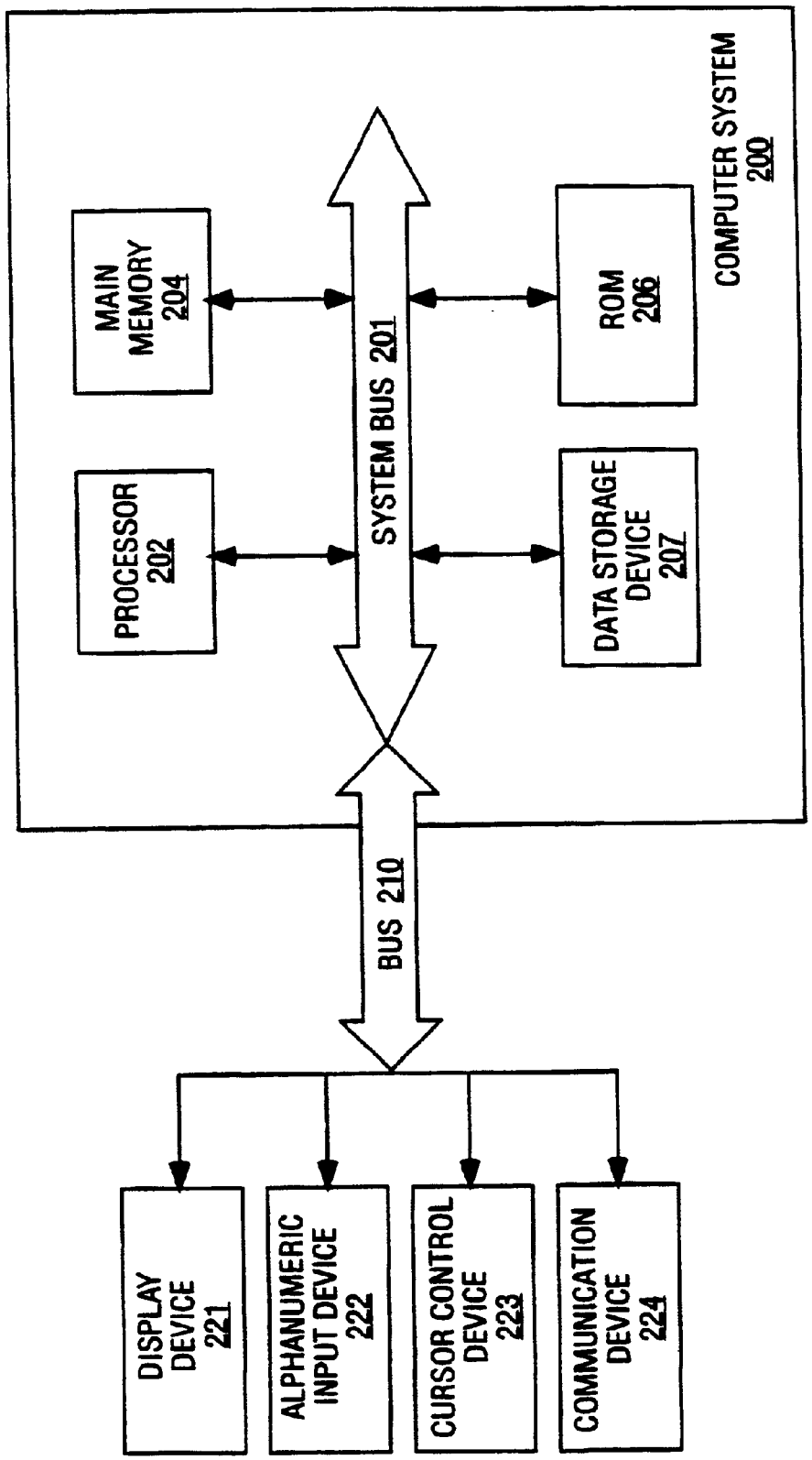
FIG. 2 is a block diagram of one embodiment for a computer system.

FIG. 2 is a block diagram of one embodiment for a computer system 200. Computer system 200 includes a system bus 201, or other communications module similar to the system bus, for communicating information, and a processing module, such as processor 202, connected to bus 201 for processing information. Computer system 200 further includes a main memory 204, such as a random access memory (RAM) or other dynamic storage device, connected to bus 201, for storing information and instructions to be executed by processor 202. Main memory 204 may also be used for storing temporary variables or other intermediate information during execution of instructions by processor 202. Computer system 200 also includes a read only memory (ROM) 206, and/or other similar static storage device, connected to bus 201, for storing static information and instructions for processor 202.

An optional data storage device 207, such as a magnetic disk or optical; disk, and its corresponding drive may also be connected to computer system 200 for storing information and instructions. System bus 201 is connected to an external bus 210, which connects computer system 200 to other devices. Computer system 200 may also be connected via bus 210 to a display device 221, such as a cathode ray tube (CRT) or a liquid crystal display (LCD), for displaying information to a computer user. For example, graphical or textual information may be presented to the user on display device 221. Typically, an alphanumeric input device 222, such as a keyboard including alphanumeric and other keys, is connected to bus 210 for communicating information and/or command selections to processor 202. Another type of user input device is cursor control device 223, such as a conventional mouse, touch mouse, trackball, or other type of cursor direction keys, for communicating direction information and command selection to processor 202 and for controlling cursor movement on display 221. A fully loaded computer system may optionally include video, camera, speakers, sound card, and many other similar conventional options.

A communication device 224 is also connected to bus 210 for accessing remote computers or servers, such as web server 100, or other servers via the Internet, for example. The communication device 224 may include a modem, a network interface card, or other well known interface devices, such as those used for interfacing with Ethernet, Token-ring, or other types of networks. In any event, in this manner, the computer system 200 may be connected to a number of servers 100 via a conventional network infrastructure, such as the infrastructure illustrated in FIG. 1 and described above.

Figure 3:
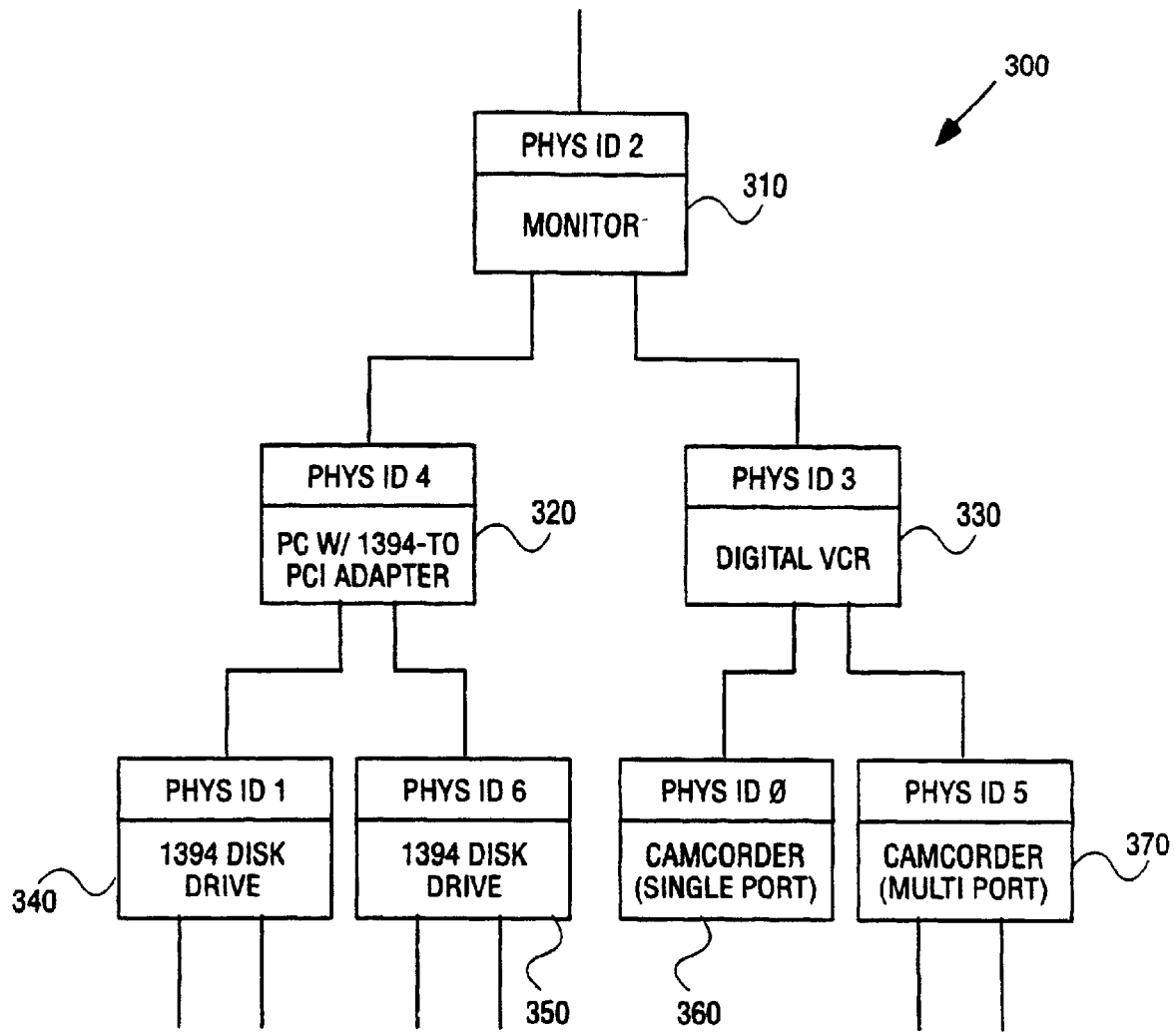
FIG. 3 is a block diagram of one embodiment for a 1394 serial bus system topology.

FIG. 3 is a block diagram of one embodiment for an IEEE 1394 standard serial bus system 300. In one embodiment, system 300 may be used for a digital video application. In one embodiment, the IEEE 1394 standard serial bus system 300 may be used as local area network 116.

In one embodiment, serial bus system 300 is a leaf-node topology and includes multiple nodes, each node representing a device having three connectors. In one embodiment, the device is an audio/video control (AV/C) device. Alternatively, other physical devices may constitute nodes connected within the leaf-node topology of system 300.

In an alternate embodiment, additional AV/C devices may be connected to the IEEE 1394 standard serial bus system 300 in a similar leaf-node topology. Monitor 310 is connected to a PC having an adapter interface 320 and to a digital VCR 330. In one embodiment, the adapter interface 320 is a 1394-to-PCI interface. The adapter interface 320 is further connected to a pair of 1394 disk drives 340, 350. The digital VCR 330 is further connected to a single port camcorder 360 and a multi port camcorder 370. Each AV/C device has access and may navigate, read, select, create, write, or delete data stored in other AV/C devices within the IEEE 1394 standard serial bus system 300, as described in further detail below.

Figure 4:
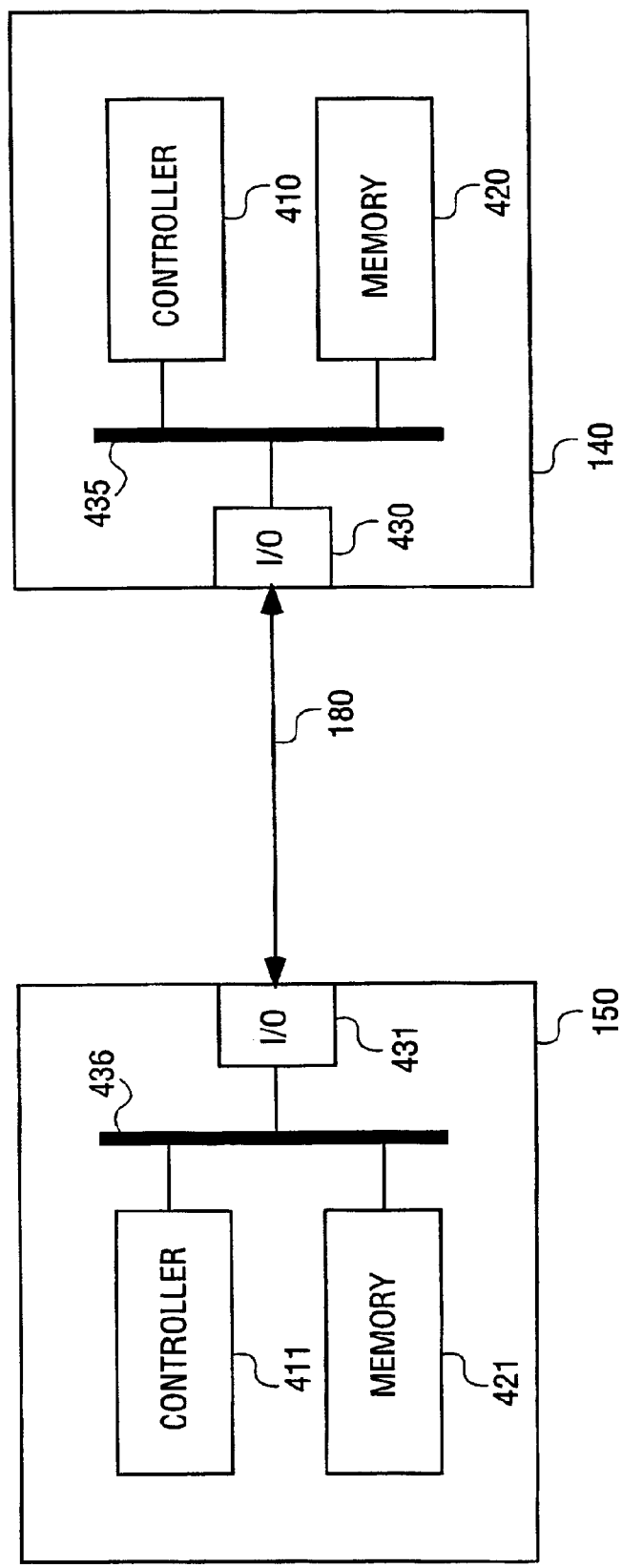
FIG. 4 is a block diagram of one embodiment for a connection between two devices shown in FIG. 1.

FIG. 4 is a block diagram of one embodiment for a connection between two devices 140 and 150 shown in FIG. 1. Referring to FIG. 4, each device 140 and 150 may be a laser printer, digital camera, set-top box, or any other appropriate consumer electronic device capable of being connected via a high speed serial bus 180. In one embodiment, serial bus 180 is a IEEE 1394 serial bus.

In one embodiment, the device 140 includes an internal controller 410, memory 420, and I/O module 430, all connected via IEEE 1394 serial bus 435. In one embodiment, device 150 also includes an internal controller 411, memory 421, and I/O module 431, all connected via IEEE 1394 serial bus 436. Although devices 140 and 150 appear to have a similar architecture, each device is configured to perform a different function. For example, in one embodiment, device 150 is an AV/C controller device and device 140 is an AV/C target device. AV/C controller device 150 accesses and manipulates data stored in AV/C target device 140 using AV/C protocol commands.

Referring to the AV/C target device 140, memory 420 may include, for example, read only memory (ROM), random access memory (RAM), and/or non-volatile memory. I/O module 430 provides connection with wide area network 110, bus bridge 170, and device 150 via the IEEE 1394 serial bus 180.

In one embodiment, I/O module 430 is a serial bus interface that complies with a serial interface standard for networking with consumer electronic devices (120–160) and bus bridge 170 within topology 100. For example, the serial bus interface 430 and topology 100 may use the IEEE 1394 standard serial bus. I/O module 430 is provided for receiving signals from and transmitting signals to other consumer electronic devices (130–160) or bus bridge 170.

In one embodiment, memory 420 stores data to be shared with other devices, for example with the AV/C controller device 150. Shared data is stored in descriptor structures described in further detail below. In addition, memory 420 provides temporary storage for voice and data signal transfers between WAN 110 and topology 100.

The 1394 standard bus protocol is designed to support peer-to-peer transfers between devices. This allows serial bus devices to transfer data between themselves without intervention from a computer system or host system. This allows high throughput between devices without affecting the performance of the computer system. Thus, a video camera may be set up to transfer between itself and a video cassette recorder without accessing a computer system.

In one embodiment, the AV/C protocol commands and responses exchanged between AV/C controller device 150 and AV/C target device 140 are transmitted through AV/C command and response frames. AV/C controller device 150 generates an AV/C command frame and writes the frame using a serial bus asynchronous write packet to a command register within the AV/C target device 140. Based on the AV/C command, AV/C target device 140 performs an appropriate task. Subsequently, target device 140 generates an AV/C response frame and writes the response frame to a response register within AV/C controller device 150.

In one embodiment, the AV/C command frame contains up to 512 bytes of data and has the structure shown in Table 1.

TABLE 1

| transmitted first | | | | | |
|---|---|---|---|---|---|
| 0000 | ctype | subunit_type | subunit ID | opcode | operand[0] |
| operand[1] | | operand[2] | | operand[3] | operand[4] |
| operand[n] | | zero pad bytes (if necessary) | | | |
| | | | | | transmitted last |

All operands are optional and are defined based on the values included in the ctype, subunit_type, and opcode fields.

In one embodiment, the ctype command type field defines one of five types of commands shown in Table 2.

TABLE 2

| Code | Command type | Description |
|---|---|---|
| $0_{16}$ | CONTROL | Used to instruct a target device to perform an operation. |
| $1_{16}$ | STATUS | Used to check a device's current status. |
| $2_{16}$ | SPECIFIC INQUIRY | Used to check whether a target device supports a particular CONTROL command. Operands are included. |
| $3_{16}$ | NOTIFY | Used for receiving notification of a change in a device's state. |
| $4_{16}$ | GENERAL INQUIRY | Used to check whether a target device supports a particular CONTROL command. Operands are not included. |
| $5_{16}$–$7_{16}$ | Reserved for future specification | |
| $8_{16}$–$F_{16}$ | Reserved for response codes | |

The subunit_type and subunit_ID fields further define the target device's address within the node. The fields enable the target device to determine whether the command is directly addressed to the target unit or to a specific subunit within the target device.

The opcode operation field defines the operation to be performed or the status to be returned by the target device.

The response response code defines one of seven types of responses shown in Table 3.

TABLE 3

| Value | Response | Description |
|---|---|---|
| $0_{16}$–$7_{16}$ | Reserved for command types | |
| $8_{16}$ | NOT IMPLEMENTED | The target does not implement the command, or doesn't implement the specified subunit. |
| $9_{16}$ | ACCEPTED | The target has executed or is executing the command. |

TABLE 3-continued

| Value | Response | Description |
|---|---|---|
| $A_{16}$ | REJECTED | The target implements the command, but cannot respond because the present state of the target doesn't allow it. |
| $B_{16}$ | IN TRANSITION | The target implements the STATUS command, but it is in a state of transition. The STATUS command needs to be retired at a future time. |
| $C_{16}$ | IMPLEMENTED/ STABLE | For INQUIRY commands, the target implements the command. For STATUS commands, the target returns STABLE and includes the results in the operand fields. |
| $D_{16}$ | CHANGED | The response frame contains a notification that the requested information has changed. |
| $E_{16}$ | Reserved for future specification | |
| $F_{16}$ | INTERIM | For CONTROL commands, the target has accepted the request but cannot return information within 100 milliseconds. For NOTIFY commands, the target accepted the command, and will notify the controller of the specified change. |

Figure 5:
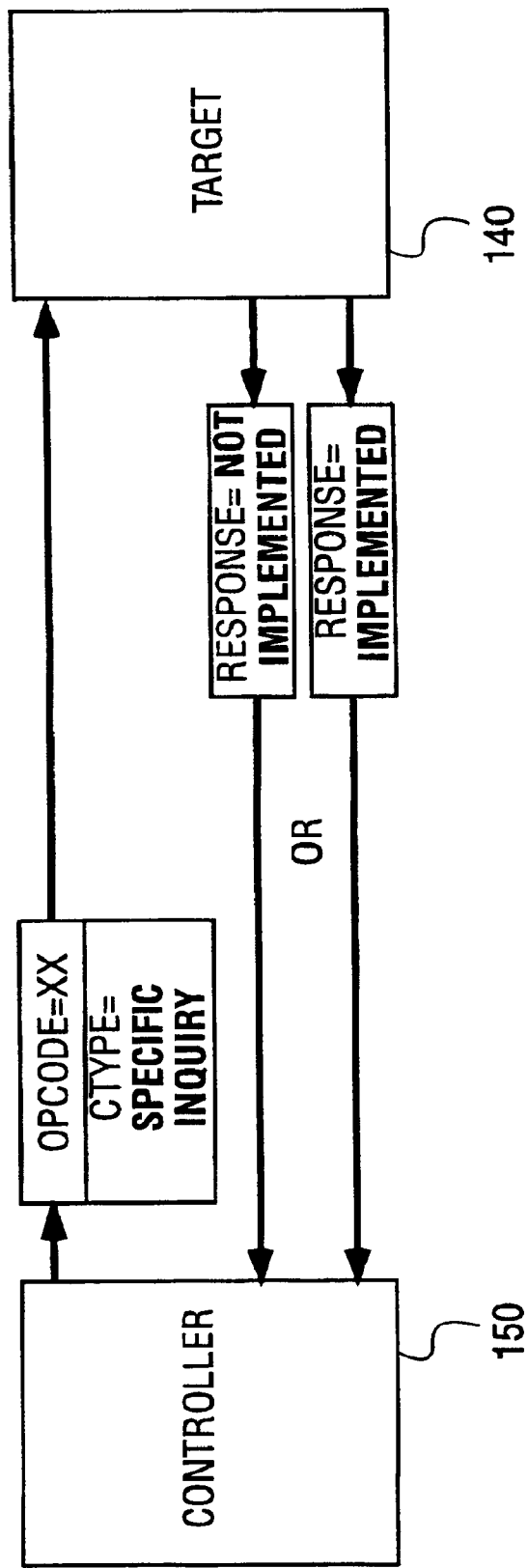
FIG. 5 is a block diagram of the connection between the AV/C controller device and the AV/C target device showing an exchange of an AV/C command for the SPECIFIC INQUIRY command type and an AV/C response for the SPECIFIC INQUIRY command type.

FIG. 5 is a block diagram of the connection between the AV/C controller device and the AV/C target device showing an exchange of an AV/C command for the SPECIFIC INQUIRY command type and an AV/C response for the SPECIFIC INQUIRY command type. The SPECIFIC INQUIRY command may be used by a controller to determine whether or not a target AV/C device supports a particular CONTROL command. Except for the ctype field, the AV/C command frame for a SPECIFIC INQUIRY command is identical to the corresponding CONTROL command.

As illustrated in FIG. 5, in one embodiment, controller device 150 may use SPECIFIC INQUIRY commands to probe the capabilities of target device 140, since the target device does not modify any state nor initiate any command execution in response to an inquiry command.

Target device 140 may return two response codes, IMPLEMENTED or NOT IMPLEMENTED, in the AV/C response frame. An IMPLEMENTED response specifies that the corresponding CONTROL command specified by opcode and operand[n] is implemented by the target device.

However, the AV/C response frame transmitted by the target device 140 does not provide to the controller device 150 any information regarding the specific reason why the command is not implemented. The controller device 150 has to resend the AV/C command frame using a new set of values until the AV/C response frame is returned IMPLEMENTED.

Alternatively, in another embodiment, the target device 140 may return the IMPLEMENTED response code and may specify within the response frame ranges of supported values for each field of the command frame that can be specified within a range.

Figure 6:
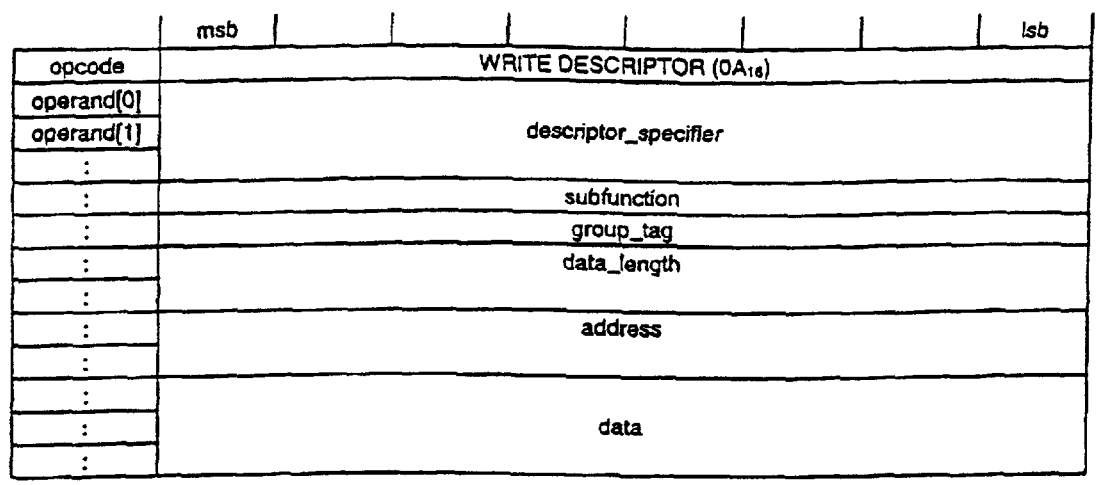
FIG. 6 is a table illustrating the format and content of a WRITE DESCRIPTOR—CONTROL command frame for the SPECIFIC INQUIRY command type.

FIG. 6 is a table illustrating the format and content of a WRITE DESCRIPTOR—CONTROL command frame for the SPECIFIC INQUIRY command type. In one embodiment, if the controller device 150 decides to assess whether it can write to a descriptor within the target device 140, a WRITE DESCRIPTOR—CONTROL command frame is sent to the target device 140. As shown in FIG. 6, the WRITE DESCRIPTOR—CONTROL command frame includes a descriptor_specifier field, a subfunction field, a group_tag field, a data_length field, an address field, and a data field. The descriptor_specifier field is further defined as shown in Table 4.

TABLE 4

| Address Offset | Contents |
|---|---|
| $00_{16}$ | Specifier_type |
| $01_{16}$ | Specifier_type_specific_fields |
| : | : |
| : | : |
| : | : |

In one embodiment, the descriptor_specifier field and the subfunction field are fields that can be specified within a range of values within the command frame. The group_tag field contains a boolean value and represents a feature that may or may not be supported within the target device 140. The data_length field, the address field, and the data field include values containing qualifying information which is independent of whether the target device 140 supports the information or not.

FIG. 7 is a table illustrating the format and content of a SPECIFIC INQUIRY response frame sent in response to the WRITE DESCRIPTOR—CONTROL command frame. As shown in FIG. 7, the SPECIFIC INQUIRY response frame returns specific information directed to each field contained within the command frame.

In one embodiment, if specified fields can only be specified within a range of values, then the response frame returns a "_response_length" field showing the length of the field, followed by specific return values that the implementation supports. If a specified value is boolean in nature, then the response frame returns a 1 value indicating support for the feature and a 0 value indicating no support. For other specified values that contain qualifying information which is independent of whether the target device supports the information or not, the response frame returns a "_response_length" field having a value of 0.

For example, in response to the descriptor_specifier field, the response frame returns a field showing the descriptor_specifier_response_length, and several fields showing the values for the supported_specifier_type[x] with x=0, 1, . . . , n. In response to the subfunction field, the response frame returns a field showing the subfunction_response_length, and several fields showing the values for the supported_subfunction_value[y] with y=0, 1, . . . , n. In response to the group_tag field, the response frame returns a group_tag_supported field showing a value of 0 or 1. For the data_length field, the address field, and the data field, the response frame returns a data_length_response_length field showing a value of 0, an address_response_length showing a value of 0, and a data_response_length field showing a value of 0.

Alternatively, if the controller device 150 transmits a NOTIFY or STATUS command containing fields that are different from the CONTROL command, the commands should also be included in the SPECIFIC INQUIRY command. In order to recognize if the SPECIFIC INQUIRY command refers to a CONTROL, NOTIFY, or STATUS command, the target device 140 reads a value in an Universal Status/Error field contained in the particular command. In one embodiment, the Universal Status/Error field is set for the SPECIFIC INQUIRY command as shown in Table 5.

TABLE 5

| Universal status/ error field | Meaning |
|---|---|
| $00_{16}$ | Return SPECIFIC INQUIRY for CONTROL command. |
| $01_{16}$ | Return SPECIFIC INQUIRY for STATUS command. |
| $02_{16}$ | Return SPECIFIC INQUIRY for NOTIFY command. |

Figure 8:
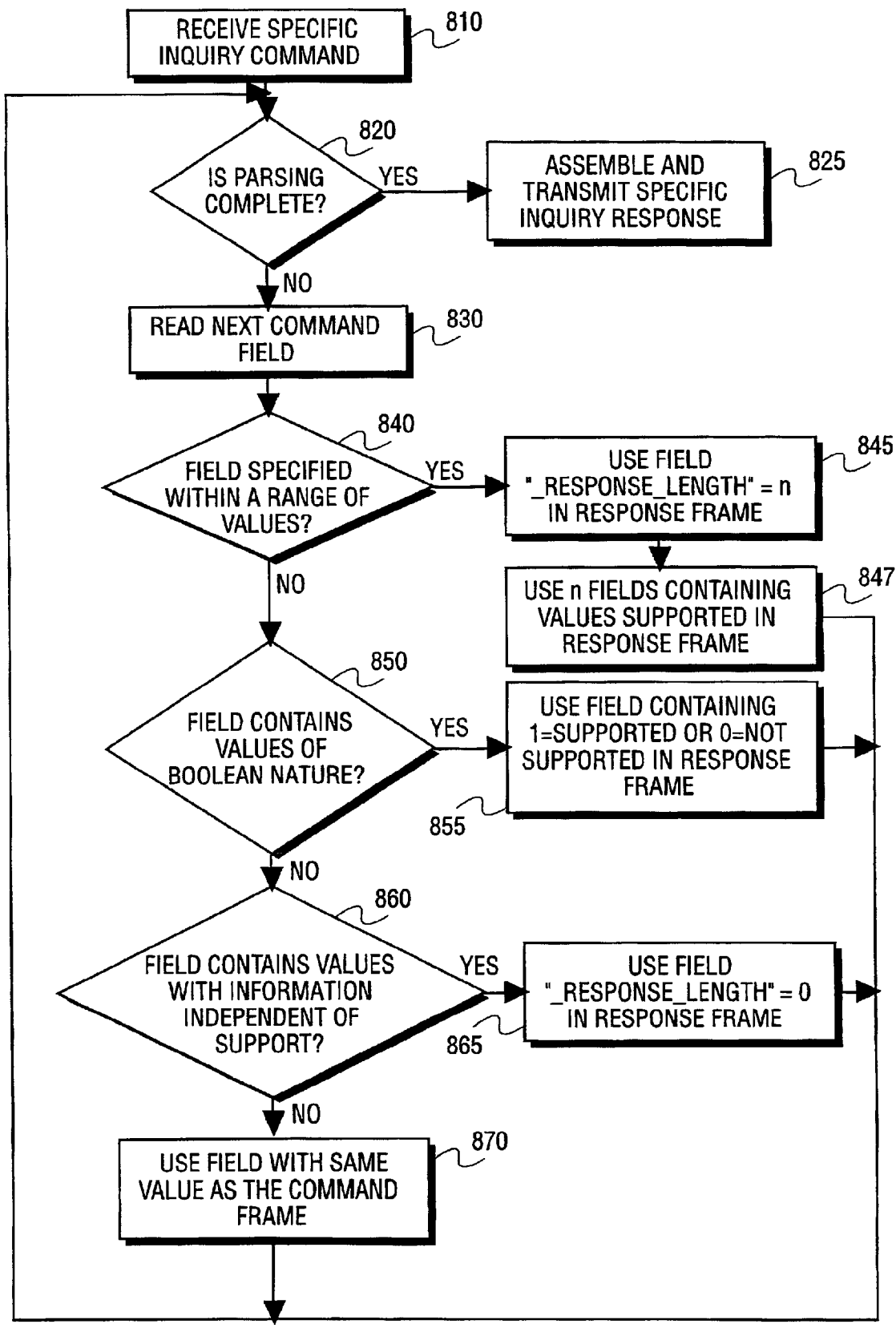
FIG. 8 is a flow diagram of one embodiment of the method for determining support capability of an AV/C target device.

FIG. 8 is a flow diagram of one embodiment of the method for determining support capability of an AV/C target device. Referring to FIG. 8, at, processing block 810, the target device receives the SPECIFIC INQUIRY command.

At processing block 820, a decision is made whether the parsing process of the SPECIFIC INQUIRY command is complete. If parsing is complete, then at processing block 825, the target device 140 assembles and transmits the SPECIFIC INQUIRY response frame. Otherwise, if parsing is not complete, at processing block 830, a command field within the SPECIFIC INQUIRY command is read.

At processing block 840, a decision is made whether the command field can only be specified within a range of values. In one embodiment, if the command field can be specified within a range of values, at processing block 845, the target device uses a "_response_length" field for the command field read, the "_response_length" field showing the length of that command field. Moreover, at processing block 847, the target device 140 uses several fields containing all the values supported for each particular field.

Otherwise, if the command field cannot be specified within a range of values, at processing block 850, a decision is made whether the command field contains values of a boolean nature. If the command field contains values of a boolean nature, at processing block 855, the target device uses a response field containing a value of 1 or 0. The target device uses a 1 value to indicate that the command field is supported and a 0 value to indicate that the command field is not supported.

Otherwise, if the command field does not contain values of a boolean nature, at processing block 860, a decision is made whether the command field contains values with qualifying information independent of support within the target device. If the command field contains values with qualifying information independent of support within the target device, at processing block 865, the target device uses an "_response_length" field showing a value of 0 in the response frame.

Otherwise, if the command field does not contain values with qualifying information independent of support within the target device, at processing block 870, the target device uses a response field having the same value with the command field.

Finally, the method reverts back to processing block 820 and the procedure is repeated.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:

receiving a command from a device requesting support capability information;

parsing said command to extract a plurality of command fields; and transmitting a response comprising a response field for each of said plurality of command fields, each response field comprising support capability information for the corresponding command field.

2. The method according to claim 1, wherein parsing said command further comprises:

reading each command field of said plurality of command fields; and determining whether said each command field is specified within a range of values.

3. The method according to claim 2, wherein said transmitting further comprises transmitting, for said each command field specified within said range of values a response field containing a length value of said each command field.

4. The method according to claim 3, wherein said transmitting further comprises transmitting a plurality of return values within said range of values for said each command field specified within said range of values.

5. The method according to claim 1, wherein parsing said command further comprises:

reading each command field of said plurality of command fields; and determining whether said each command field contains at least one value of a boolean nature.

6. The method according to claim 5, wherein said transmitting further comprises transmitting a response field containing a first predetermined response value indicating support capability for said each command field containing said at least one value of a boolean nature.

7. The method according to claim 6, wherein said first predetermined response value is a one value.

8. The method according to claim 5, wherein said transmitting further comprises transmitting a response field containing a second predetermined response value indicating no support capability for each command field containing said at least one value of boolean nature.

9. The method according to claim 8, wherein said second predetermined response value is a zero value.

10. The method according to claim 1, wherein parsing said command further comprises:

reading each command field of said plurality of command fields; and determining whether said each command field contains as least one value with information independent of said support capability.

11. The method according to claim 10, wherein said transmitting further comprises transmitting, for said each command field containing said at least one value response field containing a predetermined response value.

12. The method according to claim 11, wherein said predetermined response value is a zero value.

13. The method according to claim 1, wherein said transmitting further comprises transmitting a response field for each command field containing a response value similar to each command field.

14. The method according to claim 1, wherein said device is an audio/video control device.

15. The method according to claim 1, wherein said command is an audio/video control command of a SPECIFIC INQUIRY command type.

16. A computer readable medium containing executable instructions which, when executed in a processing system, cause the system to perform a method comprising:

receiving a command from a device requesting support capability information;

parsing said command to extract a plurality of command fields; and transmitting a response comprising a response field for each of plurality of command fields, each response field comprising support capability information for the corresponding command field.

17. The computer readable medium according to claim 16, wherein parsing said command further comprises:

reading each command field of said plurality of command fields; and determining whether said each command field is specified within a range of values.

18. The computer readable medium according to claim 17, wherein said transmitting further comprises transmitting, for said each command field specified within said range of values, a response field containing a length value of said each command field.

19. The computer readable medium according to claim 18, wherein said transmitting further comprises transmitting a plurality of return values within said range of values for said each command field specified within said range of values.

20. The computer readable medium according to claim 16, wherein parsing said command further comprises:

reading each command field of said plurality of command fields; and determining whether said each command field contains at least one value of boolean nature.

21. The computer readable medium according to claim 20, wherein said transmitting further comprises transmitting a response field containing a first predetermined response value indicating support capability for said each command field containing said at least one value of boolean nature.

22. The computer readable medium according to claim 21, wherein said first predetermined response value is a one value.

23. The computer readable medium according to claim 20, wherein said transmitting further comprises transmitting a response field containing a second predetermined response value indicating to no support capability for said each command field containing said at least one value of a boolean nature.

24. The computer readable medium according to claim 23, wherein said second predetermined response value is a zero value.

25. The computer readable medium according to claim 16, wherein parsing said command further comprises:

reading each command field of said plurality of command fields; and determining whether said each command field contains at least one value with information independent of said support capability.

26. The computer readable medium according to claim 25, wherein said transmitting further comprises transmitting, for said each command field containing said at least one value, a response field containing a predetermined response value.

27. The computer readable medium according to claim 26, wherein said predetermined response value is a zero value.

28. The computer readable medium according to claim 16, wherein said transmitting further comprises transmitting, for each command field, a response field containing a response value similar to said each command field.

29. The computer readable medium according to claim 16, wherein said device is an audio/video control device.

30. The computer readable medium according to claim 16, wherein said command is an audio/video control command of a SPECIFIC INQUIRY command type.

31. A system comprising:

a controller to transmit a command requesting support capability information for a device, and to receive a response comprising the support capability information for the device; and a device coupled to the controller to receive said command, to parse said command to extract a plurality of command fields, and to transmit said response comprising a response field for each of said plurality of command fields, each response field comprising the support capability information of the device for the corresponding command field.

32. The system according to claim 31, wherein said device, when parsing said command, reads each command field of said plurality of command fields, and determines whether said each command field is specified within a range of values.

33. The system according to claim 32, wherein said device, when transmitting said response, transmits, for said each command field specified within said range of value, a response field containing a length value of said each command field.

34. The system according to claim 33, wherein said device, when transmitting said response, further transmits a plurality of return values within said range of values for said each command field specified within said range of values.

35. The system according to claim 31, wherein said device, when parsing said command, reads each command field of said plurality of command fields, and determines whether said each command field contains at least one value of a boolean nature.

36. The system according to claim 35, wherein said device, when transmitting said response, transmits a response field containing a first predetermined response value indicating support capability for said each command field containing said at least one value of a boolean nature.

37. The system according to claim 36, wherein said first predetermined response value is one value.

38. The system according to claim 35, wherein said device, when transmitting said response, transmits a response field containing a second predetermined response value indicating no support capability for each command field containing said at least one value of boolean nature.

39. The system according to claim 38, wherein said second predetermined response value is a zero value.

40. The system according to claim 31, wherein device, when parsing said command, reads each command field of said plurality of command fields, and determines whether said each command field contains as least one value with information independent of said support capability.

41. The system according to claim 40, wherein said device, when transmitting said response, transmits, for said each command field containing said at least one value, a response field containing a predetermined response value.

42. The system according to claim 41, wherein said predetermined response value is a zero value.

43. The system according to claim 31, wherein device, when transmitting said response, transmits a response field for each command field containing a response value similar to each command field.

44. The system according to claim 31, wherein said controller is an audio/video control device.

45. The system according to claim 31, wherein said command is an audio/video control command of a SPECIFIC INQUIRY command type.

46. A apparatus comprising:
- means for receiving a command from a device requesting support capability information;
- means for parsing said command to extract a plurality of command fields; and
- means for transmitting a response comprising a response field for each of said plurality of command fields, each response field comprising support capability information for the corresponding command field.

47. The apparatus according to claim 46, wherein said means for parsing said command further comprises:
- means for reading each command field of said plurality of command fields; and
- means for determining whether said each command field contains at least one value with information independent of said support capability.

48. The apparatus according to claim 47, wherein said means for parsing further comprises means for determining whether said each command field is specified within a range of values, and said means for transmitting comprises means for transmitting, for said each command field specified within said range of values, a response field containing a length value of said each command field.

49. The apparatus according to claim 48, wherein said means for transmitting further comprises means for transmitting a plurality of return values within said range of values for said each command field specified within said range of values.

50. The apparatus according to claim 47, wherein said means for parsing further comprise means for determining whether said each command field contains at least one value of boolean nature, said means for transmitting comprises means for transmitting a response field containing a first predetermined response value indicating support capability for said each command field containing said at least one value of boolean nature.

51. The apparatus according to claim 50, wherein said first predetermined response value is a one value.

52. The apparatus according to claim 50, wherein said means for transmitting further comprises means for transmitting a response field containing a second predetermined response value indicating to no support capability for said each command field containing said at least one value of a boolean nature.

53. The apparatus according to claim 52, wherein said second predetermined response value is a zero value.

54. The apparatus according to claim 47, wherein said means for parsing said command further comprises means for determining whether said each command field contains at least one value with information independent of said support capability, and said means for transmitting further comprises means for transmitting, for said each command field containing said at least one value, a response field containing a predetermined response value.

55. The apparatus according to claim 54, wherein said predetermined response value is a zero value.

56. The apparatus according to claim 46, wherein said means for transmitting comprises means for transmitting, for each command field, a response field containing a response value similar to said each command field.

57. The apparatus according to claim 46, wherein said controller is an audio/video control device.

58. The apparatus according to claim 46, wherein said command is an audio/video control command of a SPECIFIC INQUIRY command type.

* * * * *